(12) United States Patent
Mogavero et al.

(10) Patent No.: US 10,054,068 B2
(45) Date of Patent: Aug. 21, 2018

(54) INTERNAL COMBUSTION ENGINE HAVING A TWO STAGE TURBOCHARGER

(71) Applicant: GM GLOBAL TECHNOLOGY OPERATIONS LLC, Detroit, MI (US)

(72) Inventors: Armando Mogavero, Turin (IT); Fiorello Losano, Turin (IT); Cesare Maria Meano, Turin (IT); Eugenio Manta, Valdellatorre (IT); Vincenzo Petronzi, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 18 days.

(21) Appl. No.: 14/967,465

(22) Filed: Dec. 14, 2015

(65) Prior Publication Data

US 2016/0177850 A1 Jun. 23, 2016

(30) Foreign Application Priority Data

Dec. 17, 2014 (GB) .................................. 1422516.3

(51) Int. Cl.
*F02B 33/44* (2006.01)
*F02B 23/00* (2006.01)
(Continued)

(52) U.S. Cl.
CPC ........ *F02D 41/0007* (2013.01); *F02B 37/004* (2013.01); *F02B 37/013* (2013.01);
(Continued)

(58) Field of Classification Search
CPC ............... F02D 41/0007; F02D 35/023; F02D 2200/101; F02D 37/18; F02B 37/004;
(Continued)

(56) References Cited

U.S. PATENT DOCUMENTS 4,171,936 A * 10/1979 Hageman ................ F02B 37/18
60/602
4,304,097 A * 12/1981 Kondo .................. F02B 37/186
60/602
(Continued)

FOREIGN PATENT DOCUMENTS

CN 203257533 U * 10/2013
EP 1519017 A1 * 3/2005 ............ F02B 37/013
(Continued)

OTHER PUBLICATIONS

A Machine translation Nakajima Takero, Pub. No. JP 2007-154684 A, published on Jun. 21, 2007.*
(Continued)

*Primary Examiner* — Thai Ba Trieu
(74) *Attorney, Agent, or Firm* — Lorenz & Kopf, LLP

(57) ABSTRACT

A two stage turbocharger for an internal combustion engine, the two stage turbocharger comprising a high pressure turbine fluidly connected to an exhaust manifold of the engine through a high pressure turbine inlet duct and a low pressure turbine fluidly connected to the high pressure turbine through a low pressure turbine inlet duct, wherein the low pressure turbine is a variable geometry turbine, wherein the two stage turbocharger comprise a bypass duct system to bypass the variable geometry low pressure turbine, wherein the bypass duct system comprises a bypass valve.

9 Claims, 4 Drawing Sheets

(51) Int. Cl.
*F02B 33/00* (2006.01)
*F02D 41/00* (2006.01)
*F02B 37/12* (2006.01)
*F02B 37/24* (2006.01)
*F02B 37/00* (2006.01)
*F02B 37/013* (2006.01)
*F02B 37/18* (2006.01)
*F02D 35/02* (2006.01)

(52) U.S. Cl.
CPC .......... *F02B 37/127* (2013.01); *F02B 37/183* (2013.01); *F02B 37/24* (2013.01); *F02D 35/023* (2013.01); *F02D 2200/101* (2013.01); *Y02T 10/144* (2013.01)

(58) Field of Classification Search
CPC ...... F02B 37/127; F02B 37/183; F02B 37/24; F02B 37/013; Y02T 10/144
USPC .................................. 60/612, 602; 123/562
See application file for complete search history.

(56) References Cited

U.S. PATENT DOCUMENTS

| | | | | |
|---|---|---|---|---|
| 5,408,979 A * | 4/1995 | Backlund | ................ | F02B 37/18 60/612 |
| 6,378,308 B1 * | 4/2002 | Pfluger | ................ | F02B 37/013 60/612 |
| 7,461,508 B2 * | 12/2008 | Rosin | ................ | F02D 41/0007 60/612 |
| 7,578,129 B2 * | 8/2009 | Perrin | ................ | F01D 17/143 60/612 |
| 7,628,016 B2 * | 12/2009 | Vogt | ................ | F02B 37/013 60/612 |
| 8,090,522 B2 * | 1/2012 | Gatti | ................ | F02D 41/0007 123/399 |
| 8,096,123 B2 * | 1/2012 | Liu | ................ | F02B 37/127 60/602 |
| 8,276,378 B2 * | 10/2012 | Song | ................ | F02D 41/0007 60/612 |
| 8,307,650 B2 * | 11/2012 | Robinson | ................ | F02B 37/013 60/612 |
| 8,468,821 B2 * | 6/2013 | Liu | ................ | F02D 41/0007 60/611 |
| 8,511,288 B2 * | 8/2013 | Kapus | ................ | F02D 41/0007 60/612 |
| 8,863,514 B2 | 10/2014 | Joergl et al. | | |
| 9,062,594 B2 | 6/2015 | Robinson | | |
| 2002/0078934 A1 * | 6/2002 | Hohkita | ................ | F02B 37/183 60/602 |
| 2003/0074899 A1 * | 4/2003 | Yamaguchi | ................ | F02B 37/18 60/612 |
| 2006/0059908 A1 * | 3/2006 | Schorn | ................ | F02B 37/013 60/600 |
| 2006/0070381 A1 * | 4/2006 | Parlow | ................ | F02B 37/18 60/612 |
| 2008/0173016 A1 * | 7/2008 | Barthelet | ................ | F02B 37/013 60/612 |
| 2009/0255517 A1 * | 10/2009 | Ishikawa | ................ | F02B 37/013 123/562 |
| 2010/0251709 A1 * | 10/2010 | Wirbeleit | ................ | F01D 17/12 60/602 |
| 2011/0088391 A1 * | 4/2011 | Sumser | ................ | F02B 37/18 60/602 |
| 2011/0296828 A1 * | 12/2011 | An | ................ | F02B 37/007 60/600 |
| 2011/0296830 A1 * | 12/2011 | Tsukamoto | ................ | F02D 41/0007 60/602 |
| 2013/0149126 A1 * | 6/2013 | Herrera Celaya | ................ | F02B 37/183 415/200 |
| 2014/0195134 A1 * | 7/2014 | Maier | ................ | F02B 37/013 701/101 |
| 2014/0245736 A1 * | 9/2014 | Thoss | ................ | F02B 37/18 60/602 |
| 2014/0358404 A1 * | 12/2014 | Lavertu | ................ | F02D 41/0007 701/105 |
| 2015/0010390 A1 * | 1/2015 | Onitsuka | ................ | F02B 37/183 415/145 |
| 2015/0121863 A1 * | 5/2015 | Micanek | ................ | F02B 37/183 60/605.1 |

FOREIGN PATENT DOCUMENTS

EP           1640596 A1 *    3/2006           F02B 37/013
JP          2007154684 A    6/2007

OTHER PUBLICATIONS

Great Britain Patent Office, Great Britain Search Report for Great Britain Application No. 1422516.3, dated May 7, 2015.

* cited by examiner

INTERNAL COMBUSTION ENGINE HAVING A TWO STAGE TURBOCHARGER

CROSS-REFERENCE TO RELATED APPLICATION

This application claims priority to Great Britain Patent Application No. 1422516.3, filed Dec. 17, 2014, which is incorporated herein by reference in its entirety.

TECHNICAL FIELD

The present disclosure pertains to an internal combustion engine having a two stage turbocharger.

BACKGROUND

Two stage turbochargers for internal combustion engines are known in the art and comprise a High Pressure (HP) turbocharger and a Low Pressure (LP) turbocharger, each turbocharger in turn comprising a compressor rotationally coupled to a turbine.

These turbocharger systems may be configured to operate both turbochargers at low/medium engine speeds and to operate the LP turbocharger only at high engine speed. In this second case, the HP turbocharger is bypassed.

Turbochargers allow higher internal combustion engine performances. However they are not free from drawbacks, in particular when the internal combustion engine is operated at low speed and/or low load.

A first drawback is, as an example, a not negligible thermal loss from the exhaust gases through the LP turbine housing, whose entity depends on the system's layout, and could be critical at low engine speed and load to enable the aftertreatment system to operate correctly.

The systems that treat the exhaust gases before they are emitted in the environment, in fact, need a minimum threshold temperature to guarantee a sufficiently high conversion efficiency, therefore as a result, aggressive warm-up strategies to compensate the temperature loss must be used. This results in a fuel consumption deterioration.

Within aftertreatment (AT) systems, the DPF (Diesel Particulate Filter), needs enough high and stable temperature during filter regeneration process from soot. Therefore the above mentioned thermal loss has to be recovered through injection of extra-fuel. This results, amongst others, in a reduced efficiency of soot oxidation requiring more frequent DPF regenerations and thus higher fuel consumption and oil dilution experienced by the customer. As additional drawback of more frequent regenerations, the AT is subjected to higher thermal stresses and ageing because of increased time exposure to high temperature reached during the regeneration process, with potential drawbacks on emission compliance.

Furthermore, the two stage turbocharger systems are affected, due to the turbine wheels and depending on the routing of the exhaust line from exhaust manifold to the aftertreatment system, by a higher exhaust back pressure (i.e. pressure after the exhaust valves) compared to single stage turbocharger systems. A similar impact is present on the intake side, where the low pressure stage adds a further pressure drop compared to a single stage compressor. As a result, being the exhaust manifold pressure usually higher than the inlet manifold pressure, there is a negative work done by the pistons (known as "pumping work") that increases the fuel consumption.

In accordance with an embodiment disclosed is to provide an internal combustion engine with a two stage turbocharger system that is free from the aforementioned drawbacks.

In particular, the herein described embodiments of the present invention provide an internal combustion engine with high performance charging systems, ensuring high efficiency even at low operational speed.

Provided is an internal combustion engine having a two stage turbocharger and a method of operating thereof having features in accordance with the herein described embodiments.

SUMMARY

An embodiment of the invention provides an internal combustion engine having a two stage turbocharger, the two stage turbocharger comprising a high pressure turbine fluidly connected to an exhaust manifold of the internal combustion engine through a high pressure turbine inlet duct and a variable geometry low pressure turbine fluidly connected to the high pressure turbine through a low pressure turbine inlet duct, wherein the two stage turbocharger comprises a bypass duct system to bypass the variable geometry low pressure turbine, the bypass duct system comprising a bypass valve.

Advantageously, the bypass duct system allows to bypass the variable geometry low pressure turbine, especially at low speed or low loads of the internal combustion engine.

An advantage of an embodiment of the invention is the higher temperature of the exhaust gases exiting the two stage turbocharger and reaching the aftertreatment system of the internal combustion engine. This enhances the possibility of correct operation of the aftertreatment system. Amongst others, this fact leads to a higher catalyst conversion efficiency for HC, CO and NOx, for example in catalytic converters, oxidation catalysts, lean $NO_x$ traps, selective catalytic reduction (SCR) systems, and higher particulate filters regeneration efficiency (in particular in diesel particulate filter DPF), with benefits in fuel economy and oil dilution.

Moreover, an advantageous aspect of an embodiment of the invention is to reduce the exhaust back pressure, i.e. the pressure after the exhaust valves that may obstruct the free naming of the engine pistons. Such a reduction allows for a lower fuel consumption and a better transient response in the first instants due to the improved operating conditions of the high pressure turbine.

According to an embodiment of the invention, the bypass duct system comprises a bypass duct and the bypass valve is arranged in the bypass duct.

Advantageously, a bypass duct system may be installed externally with respect to the variable geometry low pressure turbine. As a result, modifying the structure of the turbine is not needed.

According to another embodiment of the present invention, the variable geometry low pressure turbine comprises a housing, and the bypass valve is housing-integrated bypass valve, i.e. a valve arranged within the housing.

Advantageously, the bypass duct system may be composed of a limited number of already validated components, leading to reduced exhaust volume and a more compact layout. As a result, thermostructural resistance of the bypass duct system can be made higher.

According to an embodiment of the present invention, the variable geometry low pressure turbine is provided with a rotor within the housing, and the housing comprises a first chamber upstream of the rotor and a second chamber downstream of the rotor. The first chamber is fluidly connectable to the second chamber by the housing-integrated bypass valve. In other words, in the open position of the bypass valve the first chamber and the second chamber are in fluid communication.

As a result, a bypass valve may be arranged inside a variable geometry low pressure turbine with little modification of the turbine itself, guaranteeing at the same time the efficiency of the bypass duct system.

According to an embodiment of the present invention, the first chamber houses a plurality of movable vanes.

This allows for optimization of the space within the housing of the variable geometry low pressure turbine.

According to an embodiment of the present invention, the turbocharger comprises a low pressure compressor and a low pressure compressor bypass duct system to bypass the low pressure compressor.

An advantage of this embodiment is that the internal combustion engine acceleration is improved as the bypass of the low pressure compressor, and related piping, reduces the volume that inlet air has to fill. According to an advantageous aspect of the invention the bypass duct system of the low pressure compressor is operated in conjunction with the bypass duct system of the variable geometry low pressure turbine, resulting to further reduction of the pumping work and more efficient combustion enabling fuel consumption saving for the customer.

Another aspect of the present invention provides a method of operating an internal combustion engine having a two stage turbocharger, the two stage turbocharger comprising a high pressure turbine fluidly connected to an exhaust manifold of the internal combustion engine through a high pressure turbine inlet duct and a low pressure turbine fluidly connected to the high pressure turbine through a low pressure turbine inlet duct, wherein the low pressure turbine is a variable geometry turbine, and wherein the two stage turbocharger comprises a bypass duct system, provided with a bypass valve, to bypass the variable geometry low pressure turbine. The method may include monitoring at least one value of at least one operating parameter of the internal combustion engine during its operation, wherein the at least one monitored operating parameter is the engine speed and/or an engine torque related parameter. Comparing the at least one monitored value with at least one threshold value of said operating parameter allows operating the bypass valve of the bypass duct system to bypass the variable geometry low pressure turbine when the at least one monitored value is below, or equal to, said at least one threshold value.

According to an embodiment the engine torque correlated parameter is the brake mean effective pressure.

The above identified parameters have proven to be important factors to determine the timing for the bypass of the low pressure turbine; in particular they are useful to determine the conditions of low loads for the engine.

According to an embodiment of the invention, the threshold value of the engine speed and/or of the engine torque correlated parameter can be selected to define low load and/or low speed operating conditions of the internal combustion engine in correspondence of, or below, said threshold value.

As mentioned above, the variable geometry low pressure turbine can be bypassed when the monitored engine speed is below (or equal to) a threshold value. The threshold value is related to engine and turbocharger architecture and layout.

The above mentioned threshold value can be selected so that, under this value, the bypass of the low pressure turbine allows for better performances of the engine. In particular it provides for a reduced fuel consumption and an improved efficiency of the aftertreatment system, as mentioned before.

The variable geometry low pressure turbine can be bypassed when the monitored brake mean effective pressure is below, or equal to, a threshold value. The threshold value is related to engine and turbocharger architecture and layout. The threshold value can be selected so that, under this value, the bypass of the low pressure turbine allows for better performances of the engine, in particular it allows a reduced fuel consumption and an improved efficiency of the aftertreatment system, as mentioned before.

According to an embodiment of the invention, the two stage turbocharger comprises a low pressure compressor and a bypass duct system for the low pressure compressor, and the bypass duct system of the low pressure compressor can be operated to bypass the low pressure compressor when the bypass duct system for the variable geometry low pressure turbine is operated to bypass the variable geometry low pressure turbine.

According to a possible embodiment, the low pressure compressor bypass duct system is operated to bypass the low pressure compressor when the bypass valve of the bypass duct system is operated to bypass the variable geometry low pressure turbine.

According to a possible embodiment, the bypass duct system for the low pressure compressor is operated in conjunction with the bypass duct system of the variable geometry low pressure turbine.

As mentioned, the bypass of low pressure compressor, and related piping, reduces the volume that inlet air has to fill, and the internal combustion engine acceleration at low speed is improved.

The method according to one of its aspects can be carried out with the help of a computer program comprising a program-code for carrying out the method described above, and in the form of computer program product comprising the computer program.

The computer program product can be embodied as a control apparatus for an internal combustion engine, comprising an Electronic Control Unit (ECU), a data carrier associated to the ECU, and the computer program stored in a data carrier, so that the control apparatus defines the embodiments described in the same way as the method. In this case, when the control apparatus executes the computer program the method described above are carried out.

Still another aspect of the invention provides an apparatus for operating an internal combustion engine having a two stage turbocharger, the two stage turbocharger comprising a high pressure turbine fluidly connected to an exhaust manifold of the internal combustion engine through a high pressure turbine inlet duct and a variable geometry low pressure turbine fluidly connected to the high pressure turbine through a low pressure turbine inlet duct. The two stage turbocharger may have a bypass duct system, provided with a bypass valve, to bypass the variable geometry low pressure turbine. The operating apparatus may have:

means for monitoring at least one value of at least one operating parameter of the internal combustion engine during its operation, wherein the at least one monitored operating parameter is the engine speed and/or an engine torque related parameter;

means for comparing the at least one monitored value with at least one threshold value of said operating parameter;

means for operating the bypass valve of the bypass duct system to bypass the variable geometry low pressure turbine when the at least one monitored value is below, or equal to, said at least one threshold value.

The apparatus for operating an internal combustion engine having a two stage turbocharger comprises means for carrying out the method described herein.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
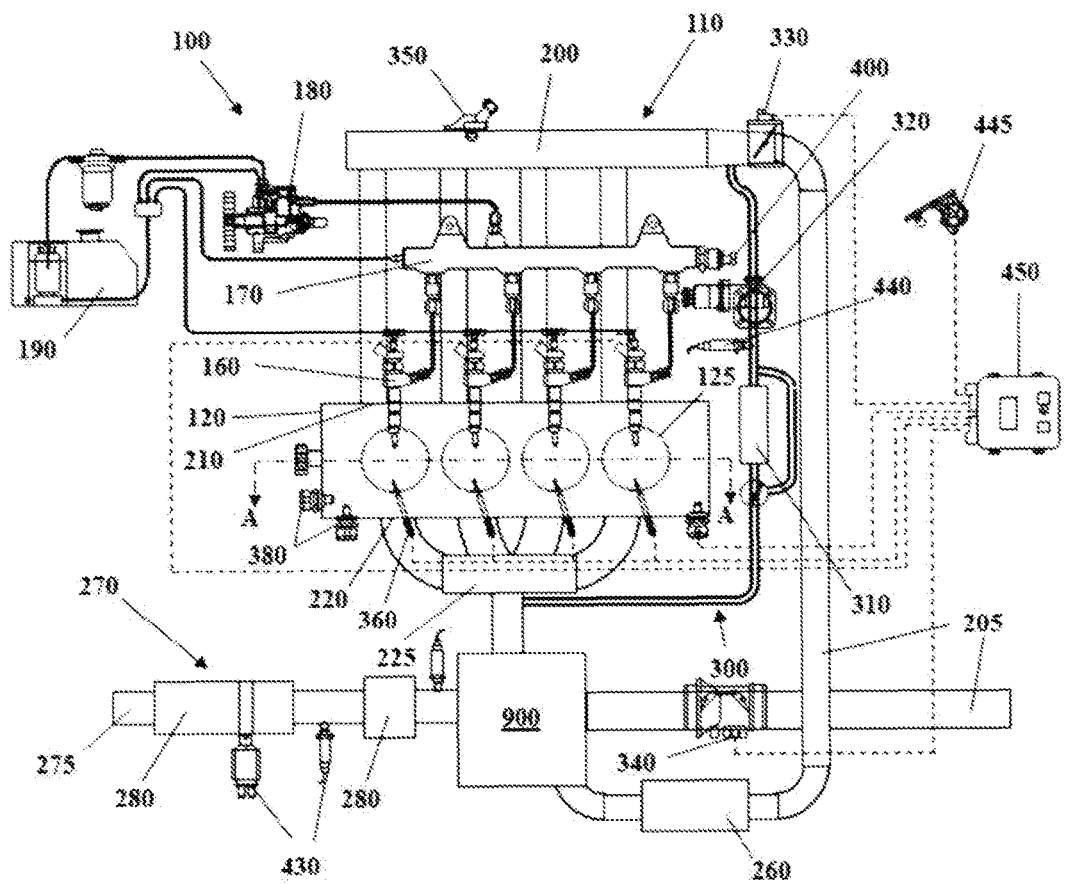
FIG. 1 shows an automotive system.
Figure 2:
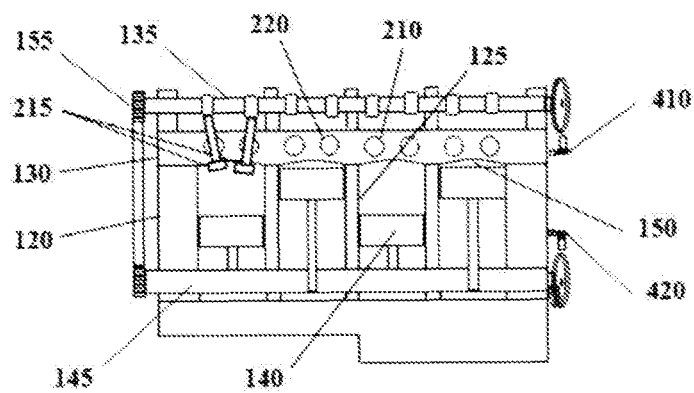
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gases causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200.

In still other embodiments, a forced air system may be provided, the forced air system comprising a two stage turbocharger 900 described in greater detail hereinafter in connection with FIG. 3.

The exhaust gases of the engine are directed into an exhaust system 270.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters. Other embodiments may include an exhaust gases recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, low pressure turbine bypass duct system 800, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460 (see FIG. 3), and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
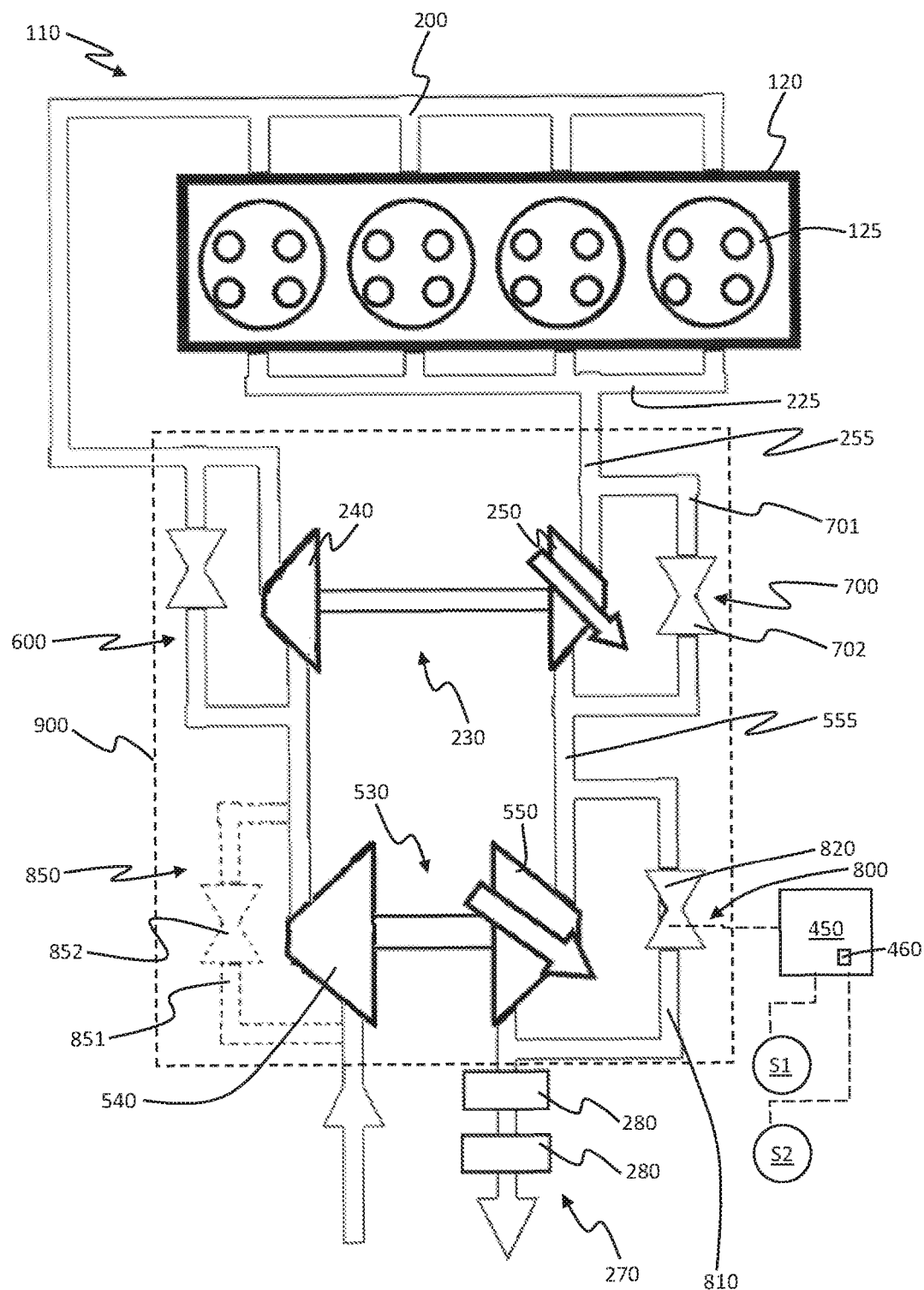
FIG. 3 is a schematic illustration of a two stage turbocharger for an internal combustion engine provided with a bypass duct system according to an embodiment of the invention.

Referring now to FIG. 3, the forced air system for the engine 110, comprising the two stage turbocharger 900, is described in more detail.

The two stage turbocharger 900 comprises a high pressure turbocharger 230, having a high pressure compressor 240 rotationally coupled to a high pressure turbine 250, the high pressure turbine 250 being fluidly connected upstream to a high pressure turbine inlet duct 255 stemming from the exhaust manifold 225 and downstream to a low pressure turbocharger 530.

In FIG. 3 a variable geometry turbine (VGT), provided with a plurality of movable vanes, to alter the flow of the exhaust gases through the high pressure turbine 250 is shown. In other embodiments, the turbocharger 230 may be a fixed geometry turbine.

In the embodiment of FIG. 3, both the high pressure turbine 250 and the high pressure compressor 240 are provided with a bypass duct system, in particular a bypass duct system 600 for the high pressure compressor 240 and a bypass duct system 700 for the high pressure turbine 250. The bypass duct systems 600, 700 may comprise a bypass duct and a bypass valve, arranged to open and close the flow inside the bypass duct.

In other embodiments of the present invention, not shown, at least one of the bypass duct systems 600, 700 for the high pressure turbine 250 and/or compressor 240 may not be present.

The low pressure turbocharger 530 is equipped with a low pressure compressor 540 rotationally coupled to a variable geometry low pressure turbine 550. The variable geometry low pressure turbine 550 receives exhaust gases from either the high pressure turbine 250 or the exhaust manifold 225 through a low pressure turbine inlet duct 555. In fact, according to a possible embodiment, as already mentioned above, a bypass duct system 700 for the high pressure turbine 250 is provided. The bypass duct system 700 for the high pressure turbine 250 comprises a bypass duct 701 branching upstream of the high pressure turbine 250 and fluidly connected to the low pressure turbine inlet duct 555, i.e. downstream of the high pressure turbine 250 and upstream of the variable geometry low pressure turbine 550.

The bypass duct 701 of the bypass duct system 700 of the high pressure turbine 250 can be provided with a bypass valve 702, arranged in the bypass duct 701. The bypass valve 702 opens and closes the bypass duct 701 of the bypass duct system 700 of the high pressure turbine 250. When the bypass valve 702 is open, the high pressure turbine 250 is bypassed and the variable geometry low pressure turbine 550 receives exhaust gases from the exhaust manifold 225, through the bypass duct 701 of the bypass duct system 700, fluidly connected to the low pressure turbine inlet duct 555.

Furthermore, the exhaust gases exiting the variable geometry low pressure turbine 550 are directed into the exhaust system 270.

According to an embodiment of the invention, the turbocharger 900 is provided with a bypass duct system 800 to bypass the variable geometry low pressure turbine 550.

According to an embodiment of the invention, the bypass duct system 800 comprises a bypass duct 810 and a bypass valve 820.

The bypass duct 810 branches upstream the variable geometry low pressure turbine 550. According to an embodiment the bypass duct 810 is fluidly connected (in fluid communication with) the exhaust system downstream of the variable geometry low pressure turbine 550.

In the shown embodiment, the bypass duct 810 is fluidly connected to the low pressure turbine inlet duct 555 and the bypass valve 820 regulates the opening and closing of bypass duct 810. According to an embodiment of the present invention, as for example shown in FIG. 3, the bypass duct 810 is also in fluid communication with the exhaust system 270.

In other embodiments, not shown, the bypass duct 810 may be fluidly connected to a different outlet or a different exhaust system than exhaust system 270.

The bypass valve 820 is fluidly connected to, and preferably arranged in, the bypass duct 810 in order to selectively allow/prevent flow of exhaust gases within the duct 810.

In the embodiment shown in FIG. 3, the bypass valve 820 is an active valve, and is controlled by the ECU 450.

In different embodiments, not shown, the bypass valve 820 may be a passive valve, e.g. a valve provided with a spring, or other suitable means, that opens the bypass valve 820 after the exhaust gases exerts a pre-determined pressure on the bypass valve 820.

Bypass valve 820 may be a wastegate valve. The wastegate valve is efficient, compact, and can be easily installed within the bypass duct system.

When the bypass valve 820 is in an open position, exhaust gases can flow through the bypass duct 810 and thus the variable geometry low pressure turbine 550 is bypassed. On the contrary, when bypass valve 820 is in a closed position, the exhaust gas flows through the variable geometry low pressure turbine 550, and it is not bypassed.

The presence of the bypass duct 810 allows not to modify the structure of the variable geometry low pressure turbine 550. In an embodiment of the present invention, as for example shown in FIG. 4, the bypass duct system 800 comprises a housing-integrated bypass valve 855, arranged within the housing 560 of the variable geometry low pressure turbine 555.

Figure 4:
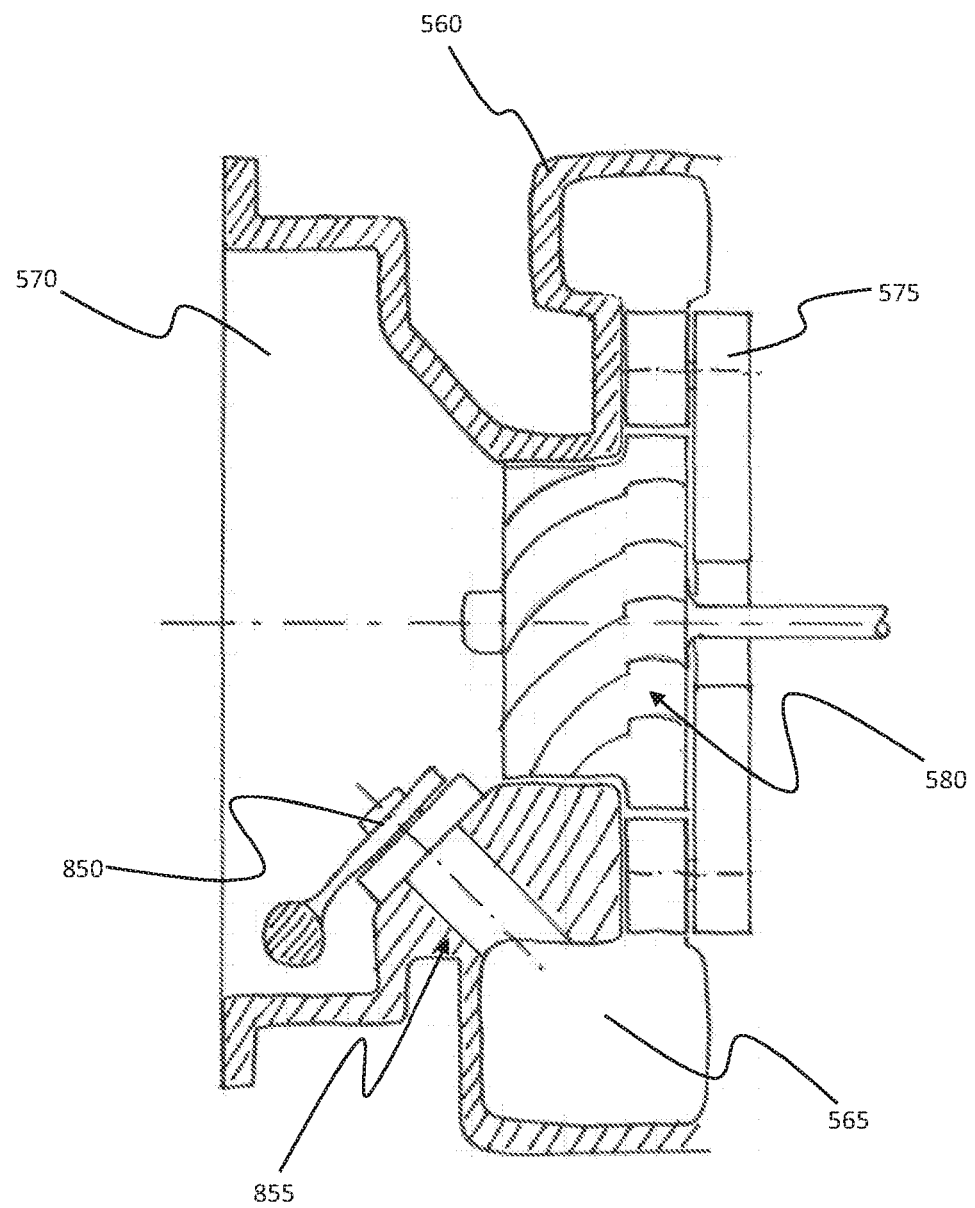
FIG. 4 is schematic illustration of a possible implementation of a bypass duct system according to an embodiment of the invention.

In particular, according to an embodiment, as for example shown in FIG. 4, a housing 560 for a variable geometry low pressure turbine 550 comprises a first chamber 565 and a second chamber 570.

Considering the exhaust gases flow within the variable geometry low pressure turbine 550 during operation of the turbocharger 900, the first chamber 565 is upstream of the rotor 580 (schematically shown) of the variable geometry low pressure turbine 550, and the second chamber 570 is downstream of the rotor 580.

The first chamber 565 may be used to house the movable vanes 575 that may be oriented according to different configurations during engine operation.

The housing-integrated bypass valve 855 fluidly connects the first chamber 565 to the second chamber 570.

In particular, the housing-integrated bypass valve 855 can be selectively opened or closed to allow or prevent fluid flow (exhaust gases flow) from the first chamber 565 to the second chamber 570, and in particular to allow or prevent fluid flow (exhaust gases flow) in a duct fluidly connecting the two chambers 565, 570. The bypass valve 855 can be arranged in correspondence to, or arranged in, a duct fluidly connecting the two chambers 565, 570.

In the shown embodiment, when the housing-integrated bypass valve 855 is in an open position, exhaust gases can flow from the first chamber 565 to the second chamber 570, the two chambers being fluidly connected (i.e. in fluid communication).

As a result, the rotor 580 of the variable geometry low pressure turbine 550 is bypassed. On the contrary, when the housing-integrated bypass valve 855 is in a closed position, the exhaust gas flows through the rotor 580 of the variable geometry low pressure turbine 550.

The housing-integrated bypass valve 855 may be either active or passive.

In an embodiment of the present invention, the housing-integrated bypass valve 855 is active, and it is connected to the ECU 450, which can command opening and closing of the housing-integrated bypass valve 855.

In an embodiment of the present invention, as for example shown in FIG. 4, the housing-integrated bypass valve 855 is a wastegate valve. The wastegate valve is efficient, compact, and can be easily installed within the bypass duct system, in particular within the housing of the turbine.

According to an embodiment, as for example shown in FIG. 3, a bypass duct system 850 for the low pressure compressor 540 can be provided in the two stage turbocharger 900.

According to a possible embodiment, the bypass duct system 850 for the low pressure compressor 540 comprises a bypass duct 851 branching upstream of the low pressure compressor 540 and fluidly connected downstream of the low pressure compressor 540. The bypass duct 851 of the bypass duct system 850 of the low pressure compressor 540 can be provided with a bypass valve 852, arranged in the bypass duct 851. The bypass valve 852 opens and closes the bypass duct 851 of the bypass duct system 850.

As it will be disclosed later in greater detail in connection to the method of operating the internal combustion engine 110, the bypass duct system 850 of the low pressure compressor 540 can be operated to bypass the low pressure compressor 540 when the bypass duct system 800 is operated to bypass the variable geometry low pressure turbine 550. According to a possible embodiment, the bypass duct system 850 of the low pressure compressor 540 is operated together with the bypass duct system 800 of the variable geometry low pressure turbine 550.

More in detail, when the bypass duct system 800 is operated to bypass the variable geometry pressure turbine 550, i.e. When the bypass valve 820 (or the housing-integrated bypass valve 855) is in an open position, the bypass duct system 850 is operated to bypass the low pressure compressor 540. In this condition the bypass valve 852 is in an open position to allow the passage of air through the bypass duct 851.

On the contrary, when the variable geometry low pressure turbine 550 is not bypassed, i.e. when the bypass valve 820 (or the housing-integrated bypass valve 855) is in a closed position, also the low pressure compressor 540 is not bypassed and the bypass valve 852 of the bypass duct system 850 of the low pressure compressor 54C) is in a closed position.

In embodiments of the present invention, e.g. the embodiments of FIG. 3 and FIG. 4, the turbocharger 900, as mentioned, may be connected to a control unit, preferably the ECU 450 of the internal combustion engine 110. The ECU may be connected to various sensors (e.g. one or more of sensors 340-445 previously mentioned). Among these sensors, there may be sensors S1, S2 to monitor operating parameters of the internal combustion engine 110.

In the shown embodiments reference S1 schematically represents one or more sensor intended to measure the engine speed and/or cooperating to evaluate the engine speed, and reference S2 schematically represents one or more sensor intended to measure an engine torque correlated parameter, for example the brake mean effective pressure and/or cooperating to evaluate the engine torque correlated parameter.

Sensor S1 and S2 may either measure the relevant parameter directly, or indirectly, and may cooperate to evaluate said engine operating parameter in combination with one or more stored or estimated value.

In further embodiments, only one sensor S1 or S2 may be used to monitor a single parameter, e.g. either the engine speed or the brake mean effective pressure.

In a different embodiment, one operating parameter may calculated indirectly, e.g. by means of a plurality of sensors and/or in combination with one or more estimated or stored values.

As mentioned, the ECU 450 may be provided with, or logically connected to, a memory system. Such a memory system may be used to store pre-selected values relating one or more of the operating parameters monitored by sensors S1, S2.

During operation of the two stage turbocharger 900, the values of the operating parameter(s) of the internal combustion engine 110 are monitored.

The monitored (current) value of the operating parameter is then compared with the value relating the operating parameter pre-stored in the ECU 450, typically one or more pre-stored threshold values.

According to the result of such a comparison, the ECU 450 controls the bypass duct system 800. In embodiments of the present invention, the ECU 450 may also operate a bypass duct system 850 for the low pressure compressor 540.

In one embodiment, as for example schematically shown in FIG. 3, the ECU 450 operates the bypass duct system 800 of the variable geometry low pressure turbine 550 and in particular the bypass valve 820, 855 until a monitored parameter reaches a threshold value, i.e. until a monitored value is equal to, or below, a threshold value. In other words, the variable geometry low pressure turbine 550 is bypassed until a monitored parameter reaches a value. Even if not shown in the figures, the ECU 450 can operate other bypass duct systems of the two stage turbocharger 900, for example the bypass duct system 850 of the low pressure compressor 540 which can be operated to bypass the low pressure compressor when the bypass duct system 800 bypass the variable geometry low pressure turbine 550. According to a possible embodiment, the bypass duct system 850 of the low pressure compressor 540 can be operated together (in conjunction) with the bypass duct system 800 of the variable geometry low pressure turbine 550. In particular, when the bypass duct system 800 is operated to bypass the variable geometry low pressure turbine 550, the bypass duct system 850 is operated to bypass the low pressure compressor 540. On the contrary, when the variable geometry low pressure turbine 550 is not bypassed, also the low pressure compressor 540 is not bypassed.

As mentioned, in one embodiment, the ECU 450, together with sensor S1, monitors the engine speed.

If the engine speed is below to, or equal to, a threshold value, the ECU 450 operates the bypass duct system 800 to bypass the variable geometry low pressure turbine 550. If the engine speed is above a threshold value, the variable geometry low pressure turbine 550 is not bypassed.

According to a possible embodiment, the engine speed threshold value is for example 2000 rpm, or a value below 2000 rpm. It has to noted that the threshold value can be selected depending on the engine and turbocharger architecture and layout. The threshold value can be selected so that, in correspondence of, or under, this value, the bypass of the low pressure turbine allows for better performances of the engine at low speed and/or low load operational conditions.

Figure 5:
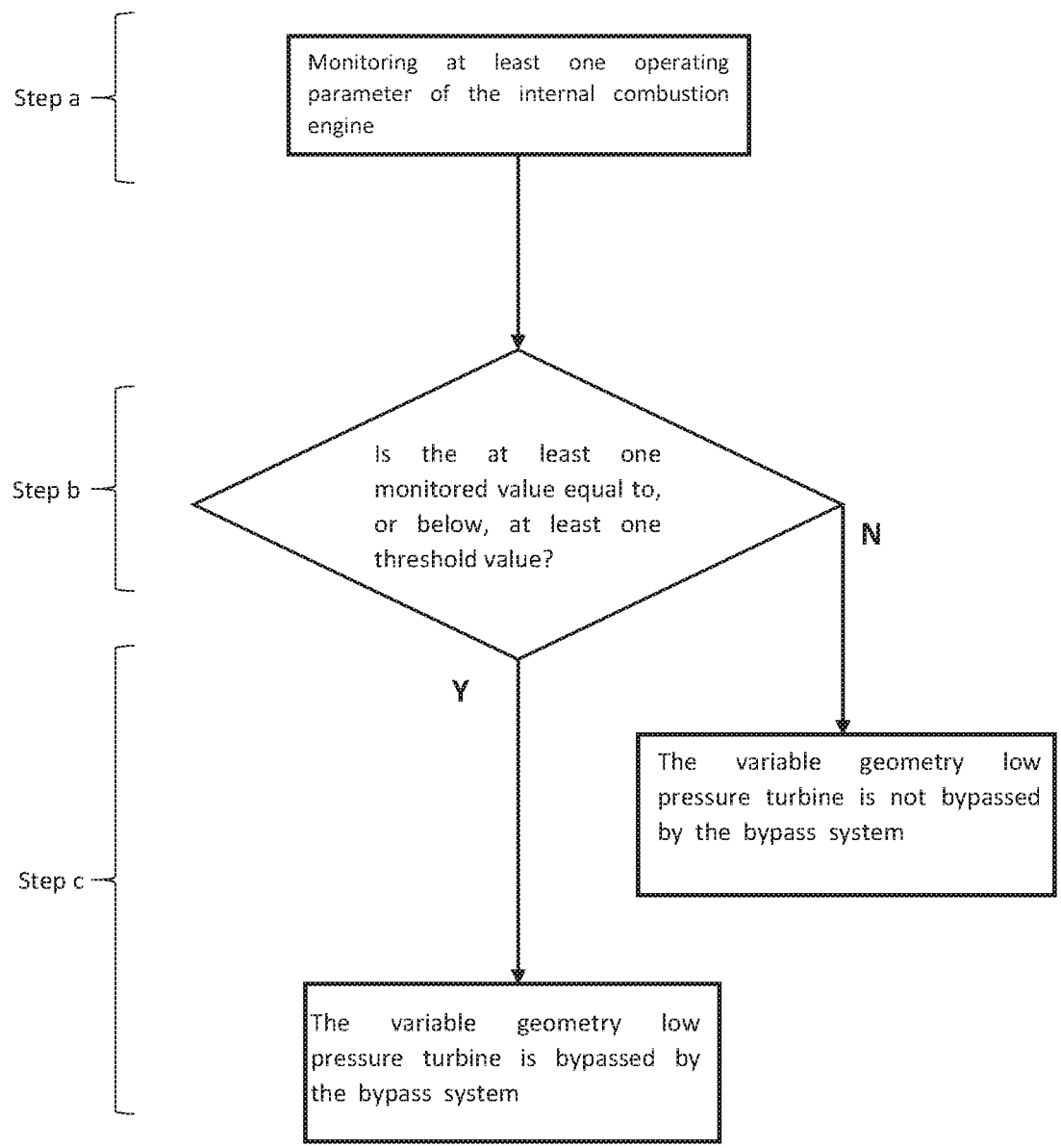
FIG. 5 is schematic illustration of the method for operating an internal combustion engine according to an embodiment of the invention.

With reference now to FIG. 5, a schematic illustration of the method for operating an internal combustion engine is provided. The method includes monitoring at least one operating parameter of the internal combustion engine at Step a. At Step b, the at least one monitored value is evaluated for determining if the monitored values is equal to or below at least on threshold value. An operation is executed at Step c based on the result of Step b. Specifically, when the at least one monitored value is equal to or below the at least one threshold, indicated as "Y" in Step b, the variable geometry low pressure turbine is bypassed by the bypass system. When the at least one monitored value is not equal to or below the at least one threshold, indicated as "N" in Step b, the variable geometry low pressure turbine is not bypassed by the bypass system.

In the shown embodiments, the ECU 450 may open the bypass valve 820 (FIG. 3), or the housing-integrated bypass valve 855 (FIG. 4) when the internal combustion engine monitored speed value is below, or equal to, a threshold value, to bypass the variable geometry low pressure turbine 550 (as schematically reported in FIG. 5). When the engine monitored speed value is greater than the threshold value, the ECU 450 may close the bypass duct system 800 (e.g. operating valves 820 or 855) and the variable geometry low pressure turbine 550 is no more bypassed (as schematically reported in FIG. 5).

In the shown embodiments, the ECU 450 may close the bypass valve 820 (FIG. 3), or the housing-integrated bypass valve 855 (FIG. 4), if the internal combustion engine monitored speed value is greater than a threshold value. Even if not shown in the figures, the ECU 450 operates the bypass duct system 850 of the low pressure compressor 540 to allow the bypass of the low pressure compressor when the low pressure turbine is bypassed. According to a possible embodiment, the bypass duct system 850 of the low pressure compressor 540 is operated according to (in conjunction with) the bypass duct system 800 of the variable geometry low pressure turbine 550. In other words, the bypass duct systems 800 and 850 are operated together (in conjunction). In an embodiment of the invention, the ECU 450, e.g. by means of sensor S2, may monitor a different parameter, e.g. the brake mean effective pressure.

Similarly to what is disclosed regarding the engine speed, the ECU 450, as a function of value monitored, for example by the sensor S2, may bypass the variable geometry low pressure turbine 550 if the brake mean effective pressure is below, or equal to, a threshold value. On the contrary, the variable geometry low pressure turbine 550 may be no the bypassed after the monitored (current) mean effective pressure value exceed a threshold value.

According to a possible embodiment, the brake mean effective pressure threshold value can be for example 5 bar, or a value below 5 bar. It has to noted that the threshold value can be selected depending on the engine and turbocharger architecture and layout. The threshold value can be selected so that, in correspondence of, or under, this value, the bypass of the low pressure turbine allows for better performances of the engine at low speed and/or low load operating conditions.

As already mentioned above in connection to the engine speed, the ECU 450 operates the bypass duct system 850 of the low pressure compressor 540 to allow the bypass of the low pressure compressor when the low pressure turbine is bypassed. According to a possible embodiment, the bypass duct system 850 of the low pressure compressor 540 is operated according to (in conjunction with) the bypass duct system 800 of the variable geometry pressure turbine 550. In other words, the bypass duct systems 800 and 850 are operated together (in conjunction).

In further embodiments, the ECU 450 may operate the bypass duct system 800 on the basis of values collected by a plurality of sensors. In one, for example, embodiment, the ECU may operate the bypass duct system 800 on the basis of the monitored value of both sensors S1 and S2, e.g. both the engine speed and the brake mean effective pressure.

According to a first embodiment, the variable geometry low pressure turbine 550 may be bypassed if all the monitored parameter respect a pre-determined condition. As an example, in the embodiments shown in the figures, the variable geometry low pressure turbine 550 may be bypassed if both the engine speed value and the brake mean effective pressure value are equal to, or below a relevant threshold value.

As an example, four hypothetical operative conditions, which are only exemplificative but not limitative, of the internal combustion engine 110 are herein discussed, with the relevant monitored values of the engine parameters, i.e. engine speed (ES) and brake mean effective pressure (BMEP), and the condition of the variable geometry low pressure turbine 550.

ES=below 2000 rpm (e.g. 1500 rpm), BMEP=below 5 bar (e.g. 4 bar); variable geometry low pressure turbine 550 is bypassed.

ES=above 2000 rpm (e.g. 2500 rpm), BMEP=below 5 bar (e.g. 4 bar); variable geometry low pressure turbine 550 is not bypassed.

ES=below 2000 rpm (e.g. 1500 rpm), BMEP=above 5 bar (e.g. 6 bar); variable geometry pressure turbine 550 is not bypassed.

ES=above 2000 rpm (e.g. 2500 rpm), BMEP=above 5 bar e.g. 6 bar); variable geometry low pressure turbine 550 is not bypassed.

In a different embodiment, the low pressure turbine may be bypassed if only one (or more) of the monitored parameter is below a relevant pre-determined threshold value. As an example, in the embodiments shown in the figures, the variable geometry low pressure turbine 550 may be bypassed if either the engine speed is below a threshold value, or the engine torque related parameter, e.g. the brake mean effective pressure, is below a threshold value. The threshold value for the engine speed and the threshold value for the engine torque related parameter are different.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An internal combustion engine having a two stage turbocharger, the two stage turbocharger comprising:
    a first stage having a high pressure turbine fluidly connected to an exhaust manifold of the engine through a first stage turbine inlet duct and a high pressure compressor rotatably coupled to the high pressure turbine;
    a second stage having:
        a variable geometry low pressure turbine fluidly connected to the high pressure turbine through a second stage turbine inlet duct;
        a low pressure compressor rotatably coupled to the low pressure turbine;
        a second stage turbine bypass system including a second stage turbine bypass duct for allowing exhaust gas to bypass the variable geometry low pressure turbine, and a second stage turbine bypass valve arranged in the second stage turbine bypass duct; and
        a second stage compressor bypass system including a second stage compressor bypass duct bypassing the low pressure compressor and a second stage compressor bypass valve arranged in the second stage compressor bypass duct; and
    an electronic control unit configured to:
        monitor a value of at least one operating parameter of the internal combustion engine from a sensor during an engine operation, wherein the at least one operating parameter is selected from the group consisting of an engine speed correlated parameter, an engine torque correlated parameter or a combination thereof;
        compare a value of the at least one operating parameter with a threshold value for the at least one operating parameter;
        control the second stage turbine bypass valve and the variable geometry low pressure turbine for allowing the exhaust gas to flow through the second stage turbine bypass duct when the value of the at least one operating parameter is less than or equal to the threshold value; and
        control the second stage compressor bypass valve for allowing the intake fluid to flow through the second stage compressor bypass duct and to bypass the low pressure compressor when the exhaust as bypasses the variable geometry low pressure turbine.

2. The internal combustion engine according to claim 1, wherein the second stage turbine bypass duct branches from the second stage turbine inlet duct upstream of the variable geometry low pressure turbine.

3. The internal combustion engine according to claim 1, wherein the variable geometry low pressure turbine comprises a housing, and the variable geometry low pressure turbine bypass valve is a housing-integrated bypass valve.

4. The internal combustion engine according to claim 3, wherein the variable geometry low pressure turbine is provided with a rotor within the housing, and the housing comprises a first chamber upstream of the rotor and a second chamber downstream of the rotor, the first chamber being fluidly connectable to the second chamber by the housing-integrated bypass valve.

5. The internal combustion engine according to claim 4, wherein the first chamber houses a plurality of movable vanes.

6. A method of operating a two stage turbocharger of an internal combustion engine having a first stage including a high pressure turbine fluidly connected to an exhaust manifold of the engine through a first stage inlet duct and a second stage including a variable geometry low pressure turbine fluidly connected to the high pressure turbine through a second stage turbine inlet duct, a low pressure compressor rotatably coupled to the low pressure turbine, a second stale turbine bypass system including a second stale turbine bypass duct bypassing the variable geometry low pressure turbine and an second stage turbine bypass valve located in the turbine bypass duct, and a second stage compressor bypass system including a second stage compressor bypass duct bypassing the low pressure compressor and a second stage compressor bypass valve located in the second stage compressor bypass duct, the method comprising:
    monitoring a value of at least one operating parameter of the internal combustion engine with a sensor during an engine operation, wherein the at least one operating parameter is selected from the group consisting of an engine speed correlated parameter, an engine torque correlated parameter or a combination thereof;
    comparing a value of the at least one operating parameter with a threshold value for the at least one operating parameter in an electronic control unit;
    controlling the second stage turbine bypass valve and the variable geometry low pressure turbine with the electronic control unit for allowing the exhaust gas to flow through the second stage turbine bypass duct when the value of the at least one operating parameter is less than or equal to the threshold value; and
    controlling the second stage compressor bypass valve with the electronic control unit for allowing the intake fluid to flow through the second stage compressor bypass duct and to bypass the low pressure compressor when the exhaust gas bypasses the variable geometry low pressure turbine.

7. The method according to claim 6, wherein said engine torque correlated parameter comprises a brake mean effective pressure.

8. The method according to claim 6, wherein said threshold value for the at least one operating parameter defines at least one of a low speed operating condition or a low load operating condition of the internal combustion engine in correspondence to, or below, said threshold value.

9. A computer program stored in a non-transitory computer-readable medium and executable an electronic control unit for operating a two stage turbocharger of an internal combustion engine having a first stage including a high pressure turbine fluidly connected to an exhaust manifold of the engine through a first stage inlet duct and a second stage including a variable geometry low pressure turbine fluidly connected to the high pressure turbine through a second stage turbine inlet duct, a low pressure compressor rotatably coupled to the low pressure turbine, a second stage turbine bypass system including a second stage turbine bypass duct bypassing the variable geometry low pressure turbine and an second stage turbine bypass valve located in the turbine bypass duct, and a second stage compressor bypass system including a second stage compressor bypass duct bypassing the low pressure compressor and a second stage compressor bypass valve located in the second stage compressor bypass duct, the computer program comprising instructions which when executed on the electronic control unit are configured to:
- monitor a value of at least one operating parameter of the internal combustion engine with a sensor during an engine operation, wherein the at least one operating parameter is selected from the group consisting of an engine speed correlated parameter, an engine torque correlated parameter or a combination thereof;
- compare a value of the at least one operating parameter with a threshold value for the at least one operating parameter;
- control the second stage turbine bypass valve and the variable geometry low pressure turbine for allowing the exhaust gas to flow through the second stage turbine bypass duct when the value of the at least one operating parameter is less than or equal to the threshold value; and
- control the second stage compressor bypass valve for allowing the intake fluid to flow through the second stage compressor bypass duct when the exhaust gas bypasses the variable geometry low pressure turbine.

\* \* \* \* \*